United States Patent [19]

Mito et al.

[11] Patent Number: 4,784,695
[45] Date of Patent: Nov. 15, 1988

[54] CARBON BLACK FOR BLENDING IN RUBBER

[75] Inventors: Masahiko Mito; Kiyonari Nakai, both of Aichi, Japan

[73] Assignee: Tokai Carbon Co., Ltd., Tokyo, Japan

[21] Appl. No.: 164,288

[22] Filed: Mar. 4, 1988

[30] Foreign Application Priority Data

Mar. 16, 1987 [JP] Japan .................................. 62-58792

[51] Int. Cl.$^4$ .......................... C04B 14/36; C08K 3/04
[52] U.S. Cl. ................................. 106/472; 423/450; 524/496
[58] Field of Search ....................... 106/307; 423/450; 524/496

[56] References Cited

U.S. PATENT DOCUMENTS

| | | | |
|---|---|---|---|
| 4,360,627 | 11/1982 | Okado et al. | 106/307 |
| 4,438,087 | 3/1984 | Casperson | 423/450 |
| 4,459,273 | 7/1984 | Dolkemeyer et al. | 106/307 |
| 4,477,621 | 10/1984 | Sato et al. | 106/307 |
| 4,540,560 | 9/1985 | Henderson | 423/450 |

Primary Examiner—Theodore Morris
Attorney, Agent, or Firm—Armstrong, Nikaido, Marmelstein & Kubovcik

[57] ABSTRACT

A carbon black for blending in rubber is disclosed, which has a BET specific surface area (N$_2$SA) within a range of 65 to 84 m$^2$/g, an a value to be obtained according to the following calculation formula, of at least 270 and a ratio of the BET specific surface area (N$_2$SA) to the iodine adsorption number (IA), N$_2$SA/AI, within a range of 1.10 to 1.35:

$$a = (24M4DBP)^2 \times (Blackness/IA)^2 \times (\overline{D}st)^2 \times 10^{-6}$$

1 Claim, 1 Drawing Sheet

CARBON BLACK FOR BLENDING IN RUBBER

BACKGROUND OF THE INVENTION

The present invention relates to carbon black for blending in rubber. More particularly, the invention relates to carbon black which can be suitably blended in rubber for use for the tread of passenger tires which is required to possess both of a high abrasion resistance and a high resilience.

Rubber material for constituting the tread of passenger tires is required to have dynamic properties to suppress the loss of the tire driving energy, such as a high resilience and a low heat build-up. Then, to improve the dynamic properties of the rubber material by blending carbon black in the rubber, it is known to be effective to make use of such a carbon black as having a large particle diameter [that is to say, a small BET specific surface area ($N_2SA$)]. However, such carbon black shows a disadvantageous behavior with respect to the reinforcement of rubber, and tends to considerably lower the abrasion resistance of the rubber, which is a most important factor characterizing treads of tires and which should preferably be as high as possible.

In view of the above, conventionally it has been practiced to secure a high abrasion resistance of the tread of passenger tires by blending in the rubber for the tire tread a carbon black of the class having a BET specific surface area of at least 85 $m^2/g$ and, at the same time, attempt to attain an improvement in or relating to the resilience by selectively using a carbon black characterized by having a broad aggregate size distribution.

However, using one of carbon blacks lying within a particle size range smaller than 85 $m^2/g$ in terms of the BET specific surface area, although an improvement can be realized in or relating to the resilience, a problem is posed such that the abrasion resistance is considerably lowered, and the rubber incorporating the carbon black can be no longer satisfactory in the light of the characteristics required of the rubber member for the tread of passenger tires.

SUMMARY OF THE INVENTION

Objects of the present invention are to obviate the above indicated problems and difficulties in the prior art and to provide carbon black which lies within a particle size range up to and including 84 $m^2/g$ in terms of the BET specific surface area and can impart to rubber both of a high abrasion resistance and a high resilience, at the same time.

Such objects of the invention can be attained according to the present invention by providing a carbon black which can satisfy the requirements on properties of the carbon black that the carbon black has a BET specific surface area ($N_2SA$) within a range of 65 to 84 $m^2/g$, that it has an a value to be obtained according to the following calculation formula, of at least 270 and that it has a ratio of the BET specific surface area ($N_2SA$) to the iodine adsorption number (IA), $N_2SA/AI$, within a range of 1.10 to 1.35:

$$a = (24M4DBP)^2 \times (Blackness/IA)^2 \times (\bar{D}st)^2 \times 10^{-6}$$

DESCRIPTION OF THE PREFERRED EMBODIMENTS

Figure 1:
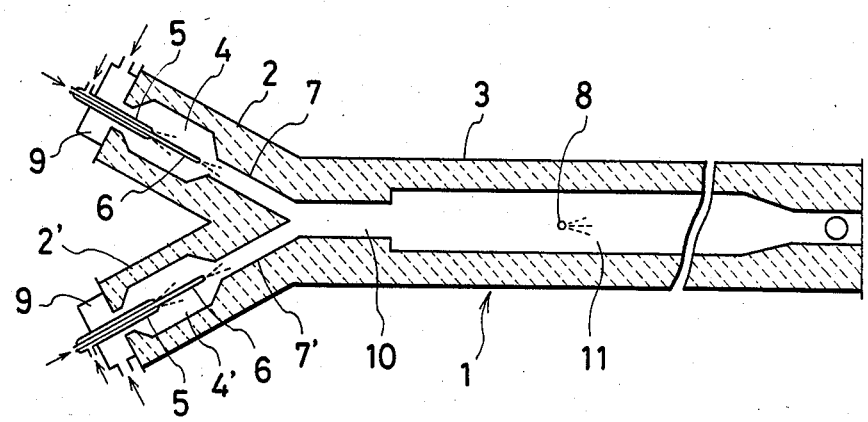
FIG. 1 shows a schematic sectional view of an oil furnace of a Y-shaped structure for the production of the carbon black according to the present invention.

Among the requirements on properties of carbon black defined according to the present invention, the limitation on the particle size range that the BET specific surface area ($N_2SA$) is within a range of from 65 to 84 $m^2/g$ comes under a condition for that, while a desirable resilience and a low heat build-up can be imparted to rubber, a considerable lowering of the abrasion resistance can be avoided.

If, in addition to the above limitation, the further requirements according to the invention that the a value is maintained above the a values of conventional carbon black products, namely at least at 270, and that the $N_2SA/IA$ ratio is adjusted within a range of 1.10 to 1.35 are met, then it is feasible to maintain the abrasion resistance at an acceptable level and yet effectively avoid a lowering of properties to do with the processing of the rubber containing carbon black.

The above requirements characterizing properties of carbon black, defined according to the present invention, are determined according to the following manners.

(1) BET Specific Surface Area ($N_2SA$)

$N_2SA$ values were determined according to ASTM D3037-78 "Standard Methods of Testing Carbon Black Surface Area by Nitrogen Adsorption", Method B. Incidentally, if found by this method, the BET specific surface area ($N_2SA$) value of IRB (Industry Reference Black) #5 is 80.3 $m^2/g$.

(2) 24M4DBP (Dibutyl Phthalate Absorption Number of Compressed Sample)

24M4DBP values were found according to ASTM D3493-79 "Carbon Black Dibutyl Phthalate Absorption Number of Compressed Sample".

(3) Blackness

Dried carbon blacks having a grain size up to and including 149$\mu$ were sampled by weighing in 0.500 g portions, and after the carbon black sample and linseed oil which was dropwise added to the carbon black were sufficiently mixed together on a glass plate, the resulting paste was kneeded by a Hoover type muller for 25×5 times under a load of 15 lb and the kneaded paste of carbon black swmple was made a thin film on a glass plate.

On the other hand, a thin film of a reference carbon black IRB #2 was preparatively formed on a glass plate in same manners as above, and the reflector head #3832A of Densicron A9155 (a reflection photometer manufactured by Densicron, Welch Scientific Co., U.S.A.) was placed on the film with the meter set at 50%. Then, with the head of the photometer moved, the values were metered on at least three different points on the film to ascertain that the metered values were within a range of 49.5 to 50.5%.

Then, metering of the values of the carbon black samples were operated with the head of the photometer moved to five different points on the film of each carbon black sample, and employing the average of the values metered at the five different points as the measured value of respective carbon black samples, the Blackness was calculated according to the following equation:

Blackness = $(50/T) \times 100 (\%)$ wherein T is the measured value of each carbon black sample, 100 means the Blackness of the reference carbon black IRB #2, and 50 means the set value of the reference carbon black IRB #2.

(4) IA (Iodine Adsorption Number)

IA values were found according to JIS K6221 (1975) "Test Method for Carbon Black for Rubber", 6.2.1., Adsorption Number A Method.

In greater detail, 0.5±0.005 g precisely weighed out of each dried carbon black was charged in a 200 ml Erlenmeyer flask equipped with a stopper, into which 25 ml of a 0.0473N iodine solution was added, and the resulting mixture was shaken at a rate above 120 strokes/min for 1 minute at room temperature. Then, the carbon black sample was isolated and 20 ml of the filtrate was titrated with a 0.0394N dosium thiosulfate solution (a ml). Separately. a blank test was performed by same procedures as above (b ml). The iodine adsorption numbers of the carbon black samples were calculated according to the following equation:

$$IA = \frac{b-a}{b} \times \frac{V}{W_D} \times N \times 126.91 \times f$$

wherein
IA: the iodine adsorption number (mg/g);
$W_D$: the weight of the dry carbon black (g);
V: the amount of the iodine solution added (m);
N: the normality of the iodine solution (0.047); and
f: the factor of the iodine solution.

(5) $\overline{D}$st ($\overline{D}$st Mode Diameter)

Carbon blacks were dried according to JIS K 6221 (1975), 6.2.1. A Method and sampled by precision weighing. Each carbon black sample was mixed in a 20% aqueous solution of ethanol containing an appreciable amount of a surfactant (a disperser) to prepare a dispersion solution having a carbon black concentration of 50 mg/l, which was sufficiently dispersed by ultrasonic wave irradiation to provide a testing sample.

On the other hand, 10 ml of a spin liquid (a 2% solution of glycerol in water) was added to each liquid sample, and to the resulting mixture solution, 1 ml of a buffer liquid (an aqueous ethanol solution) was added. Using a syringe, 0.5 ml of the resulting testing sample was supplied into a disc centrifuge device (a product of Joyes Loebl, the United Kingdom) which was set to rotate at a rotation velocity of 8000 rpm, and a centrifugal classification was initiated. At the same time as this, a recorder was put into operation to optically obtain a curve of the aggregate equivalent Stokes diameter distribution. The Stokes equivalent diameter (nm) of the maximum frequency (the maximum absorbency) on the above obtained curve was taken as the $\overline{D}$st. Incidentally, according to the same manners as above, the $\overline{D}$st of ASTM D-24 Standard Reference Black C-3 ( N234) was found to be 80 nm.

The carbon black having the above specified properties for use for or in the present invention is prepared for example according to the disclosure in Japanese patent application Kokai publication No. 59-49267, with use of an oil furnace of a Y-shaped structure as shown in the accompanying single figure of the drawings. As illustrated in the figure of the drawings, the oil furnace generally indicated at 1 comprises two generators 2 and 2', and a main reaction zone 3 into which the generators 2 and 2' converge. The generator 2 comprises a combustion chamber 4 and a pyrolysis duct 7 connected to the combustion chamber 4, and the generator 2' comprises a combustion chamber 4' and a pyrolysis duct 7' connected to the combustion chamber 4'. In each of the combustion chambers 4 and 4', there are provided a burner 5 and a feedstock oil injection nozzle 6 which are coaxially arranged relative to each other. A gas stream of an intermediate carbon black product formed in the combustion chamber 4 and a same gas stream formed in the combustion chamber 4' are at the same time introduced at a high speed into the main reaction zone 3 through the pyrolysis ducts 7 and 7' and subjected to collision against each other to obtain the intended carbon black product. Further, the reference numeral 8 denotes a spray nozzle for quenching water, 9 being a wind box.

In the above preparation of carbon black, the operation conditions in the generators 2 and 2' and the residence time in the furnace of gas streams of the intermediate carbon black product may be suitably controlled to obtain the carbon black having properties as specified according to the present invention. Residence time is termed above to mean the time required for the passage of flows of burnt gas from the feedstock oil injection nozzle to the water quenching point.

The carbon black of the present invention can be blended in various synthetic rubbers and natural rubber according to commonly practised manners.

According to the present invention, the BET specific surface area ($N_2SA$) is set at such a relatively low value as to be within a range of 65 to 84 m²/g, and as a result of this, the abrasion resistance tends to lower. However, this tendency can be effectively suppressed according to the invention by controlling the a value which is determined depending on values of the 24M4DBP, the Blackness/IA ratio and $\overline{D}$st, to be at least 270, a significantly higher value than the a values of conventional carbon black products, and also by adjusting the $N_2SA/IA$ ratio to be within a range of 1.10 to 1.35.

Therefore, although it has a BET specific surface area ($N_2SA$) below 85 m²/g, the carbon black of the invention can impart to rubber both of a desirable resilience and a high abrasion resistance, at the same time.

Thus, by blending the carbon black of the invention is rubber for the tread rubber of passenger tires for example, it is feasible to obtain a reduction of the rolling resistance during running of tires and a fuel saving of automobiles.

The presen invention will now be described in greater detail in connection with Examples and Comparative Examples.

An oil furnace of a Y-shaped structure as shown in FIG. 1 was built, which comprised a first generator 2 and a second generator 2' which were arranged at an angle of 60° relative to each other and converged together into a main reaction zone 3 comprising a front-stage small diametral part 10 having 135 mm for the inner diameter and 850 mm for the length and a rear-stage large diametral part 11 having 300 mm for the inner diameter and 4000 mm for the length which were connected to each other. The first generator 2, which had a wind box 9 mounted at a head end portion thereof, comprised a combustion chamber 4 of 400 mm in inner diameter and 800 mm in length (including 200 mm of a conical portion), having a burner 5 and a feedstock oil injection nozzle 6 mounted therein and a pyrolysis duct 7 of 80 mm in inner diameter and 700 mm in length formed therein. Similar to the first generator 2, the second generator 2' had a wind box 9 mounted at a head end portion thereof and comprised a combustion chamber 4' of 650 mm in inner diameter and 800 mm in length (including 200 mm of a conical portion), having a burner 5 and a feedstock oil injection nozzle 6 mounted therein and a pyrolysis duct 7' of 110 mm in inner diameter and 1000 mm in length formed therein.

For the feedstock oil, use was made of an aromatic hydrocarbon oil having 1.0703 for the specific gravity (15/4° C.), 2.10 for the Engler viscosity (40/20° C.), 0.03% for the content of matters insoluble in benzene, 140 for the correlation index (BMCI) and 103° C. for the initial boiling point. For the fuel oil, a hydrocarbon oil was used, which had 0.903 for the specific gravity (15/4° C.), 16.1 for the viscosity (cSt, at 50° C.), 5.4% for the residual carbon content, 1.8% for the sulfur content and 96° C. for the flash point.

Using the above described oil furnace, feedstock oil and fuel oil and under the production conditions shown in the below Table 1, preparations were made of carbon blacks (4 different kinds) embodying the present invention.

TABLE 1

| Example No. | Generator (2 or 2') | Total Air Supply Rate (Nm³/h) | Fuel Oil Supply Rate (kg/h) | Fuel Oil Combustion Rate (%) | Feedstock Oil Supply Rate (kg/h) | Residence Time in Furnace (milli-second) |
|---|---|---|---|---|---|---|
| 1 | 2 | 2600 | 154 | 165 | 839 | 3.5 |
|   | 2' | 1600 | 65 | 240 | 764 |   |
| 2 | 2 | 1800 | 98 | 180 | 645 | 4.6 |
|   | 2' | 1400 | 62 | 220 | 597 |   |
| 3 | 2 | 1500 | 61 | 240 | 614 | 2.8 |
|   | 2' | 1500 | 74 | 200 | 632 |   |
| 4 | 2 | 1300 | 75 | 170 | 565 | 6.7 |
|   | 2' | 2000 | 93 | 210 | 998 |   |

Various properties determined and/or calculated of the above prepared carbon blacks are shown in Table 2 below, in which Comparative Examples 5 to 8 respectively represent a carbon black prepared according to the conventional method and having a BET specific surface area ($N_2SA$) of a same level as the $N_2SA$ value of the carbon black according to the present invention, while the Comparative Example 9 represents a carbon black prepared by the conventional method and having a BET specific surface area ($N_2SA$) of at least 85 m²/g.

TABLE 2

|  | Example | | | | Comparative Example | | | | |
|---|---|---|---|---|---|---|---|---|---|
|  | 1 | 2 | 3 | 4 | 5 | 6 | 7 | 8 | 9 |
| $N_2SA$ (m²/g) | 75 | 83 | 72 | 67 | 74 | 74 | 84 | 82 | 93 |
| 24M4DBP (ml/100 g) | 113 | 110 | 110 | 110 | 86 | 96 | 86 | 100 | 101 |
| Dst (nm) | 123 | 124 | 108 | 123 | 103 | 110 | 97 | 106 | 105 |
| Blackness (% vs IRB#2) | 96 | 92 | 93 | 90 | 90 | 88 | 91 | 96 | 102 |
| IA (ml/g) | 64 | 68 | 66 | 67 | 70 | 70 | 80 | 84 | 93 |
| $N_2SA$/IA | 1.172 | 1.176 | 1.182 | 1.104 | 1.057 | 1.057 | 1.050 | 0.976 | 1.000 |
| Blackness/IA | 1.500 | 1.353 | 1.409 | 1.343 | 1.286 | 1.257 | 1.138 | 1.143 | 1.097 |
| a value* | 435 | 341 | 280 | 330 | 130 | 176 | 90 | 147 | 135 | a value* = (24M4DBP)² × (blackness/IA)² × (Dst)² × 10⁻⁶

Then, each of the various carbon blacks shown in the above Table 2 was blended in styrene-butadiene rubber (SBR) according to the compounding specification shown in the following Table 3.

TABLE 3

| Components Blended | Parts by Weight |
|---|---|
| Styrene-Butadiene Rubber (SBR 1500) | 100.0 |
| Carbon Black | 50.0 |
| Stearic Acid | 1.5 |
| Zinc Oxide | 5.0 |
| Vulcanization Accelerator | 2.0 |
| Sulfur | 2.0 |

Each of the resulting blends was vulcanized at 145° C. for 50 minutes to obtain a rubber composition, of which various rubber characteristics were determined. Results of the determination are shown in the below Table 4, in which the Example numbers and Comparative Example numbers correspond to those in the above Table 2 respectively.

Further, determinations of rubber characteristics were made according to methods and under conditions as described below.

(1) Abrasion Loss Amount

The determination was made using a Lambourn abrasion tester (a mechanical slip type tester), under the following conditions.

Test Piece:
  thickness: 10 mm
  outer diameter: 44 mm
Emery Wheel:
  type: GC type
  particle size: 80
  hardness: H
Carborundum Powder Added:
  particle size: #80
  amount: about 9 g/min.
Relative Slipping Ratio between the Emery wheel surface and the test piece: 24%, 60%
Rotation Number of the Test Piece: 535 rpm
Testing Load: 4 kg

(2) Heat Build-Up Characteristic

The determination was made according to ASTM D623-78 (using a Goodrich flexometer).

(3) Others

Determinations were made according to JIS K6301 "Physical Testing Method for Vulcanized Rubber".

TABLE 4

|  | Example | | | | Comparative Example | | | | |
| --- | --- | --- | --- | --- | --- | --- | --- | --- | --- |
|  | 1 | 2 | 3 | 4 | 5 | 6 | 7 | 8 | 9 |
| Hardness (Hs) | 71 | 71 | 71 | 71 | 68 | 70 | 67 | 70 | 72 |
| 300% Modulus | 238 | 209 | 208 | 214 | 162 | 200 | 162 | 198 | 203 |
| Tensile Strength (kg/cm$^2$) | 264 | 256 | 266 | 263 | 292 | 274 | 281 | 269 | 276 |
| Elongation (%) | 415 | 465 | 405 | 390 | 520 | 440 | 500 | 440 | 430 |
| Resilience (%) | 52 | 52 | 50 | 53 | 49 | 47 | 46 | 47 | 44 |
| Heat Build-up (°C.) | 29.4 | 29.6 | 30.5 | 29.2 | 31.5 | 33.0 | 32.4 | 32.8 | 33.3 |
| Abrasion Loss Amount | | | | | | | | | |
| LA 24% (ml/5 min) | 0.0672 | 0.0685 | 0.0678 | 0.0691 | 0.0752 | 0.0729 | 0.0750 | 0.0733 | 0.0689 |
| LA 60% (ml/min) | 0.0681 | 0.0692 | 0.0698 | 0.0692 | 0.0825 | 0.0735 | 0.0761 | 0.0710 | 0.0682 |

With reference to the results of determinations shown in the above Table 4 and the property values shown in the before recited Table 2, the rubber compositions according to Examples and those according to Comparative Examples may be put for a comparison together, to see that in cases where carbon blacks used are of a same level with respect to the BET specific surface area (N$_2$SA), the rubber compositions according to the Examples are significantly improved in or relating to the resilience and the heat build-up, factors of the dynamic properties of the rubber composition, while their abrasion resistance values are comparable to those of the rubber compositions of Comparative Examples. It is also seen that the rubber compositions according to Examples have rubber characteristics which are not inferior to those of the rubber composition of Comparative Example 9 the carbon black of which has a BET specific surface area (N$_2$SA) exceeding 85 m$^2$/g.

We claim:

1. A carbon black for blending in rubber which has a BET specific surface area (N$_2$SA) within a range of 65 to 84 m$^2$/g, an a value to be obtained according to the following calculation formula, of at least 270 and a ratio of the BET specific surface area (N$_2$SA) to the iodine adsorption number (IA), N$_2$SA/AI, within a range of 1.10 to 1.35:

$$a = (24M4DBP)^2 \times (\text{Blackness}/IA)^2 \times (\overline{D}st)^2 \times 10^{-6}$$

* * * * *